April 2, 1940.  W. S. WOLFRAM  2,195,666.
FRICTION CLUTCH
Filed March 25, 1939
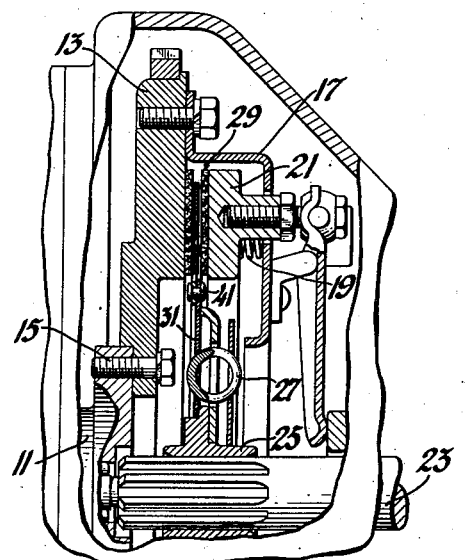
Fig.1
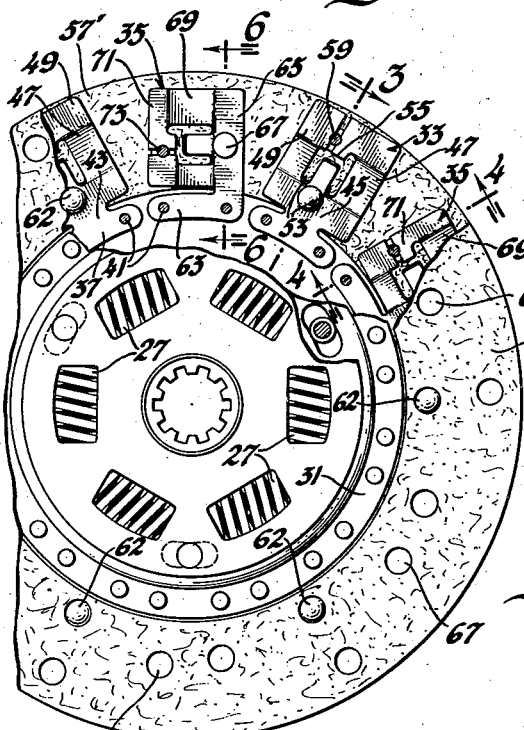
Fig.2
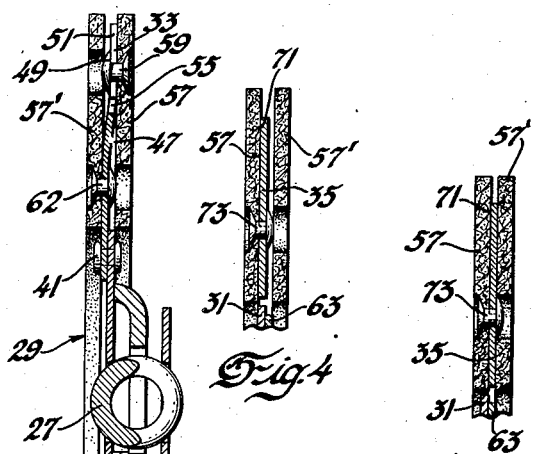
Fig.3
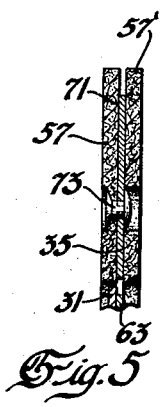
Fig.4
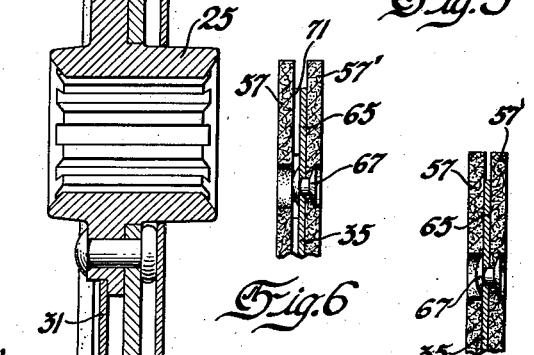
Fig.5
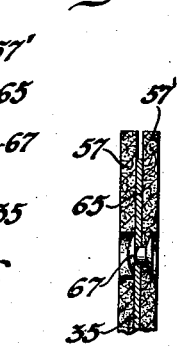
Fig.6
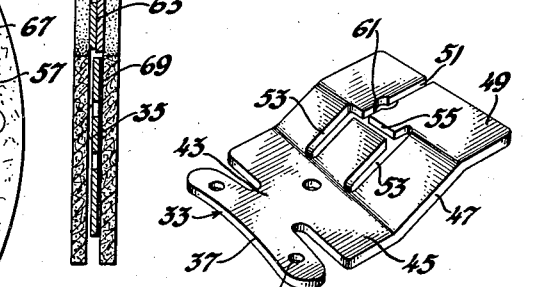
Fig.7
Fig.8
Inventor
William S. Wolfram
By Blackmon, Spencer & Hurd
Attorneys Patented Apr. 2, 1940

2,195,666

UNITED STATES PATENT OFFICE 2,195,666

FRICTION CLUTCH

William S. Wolfram, Dayton, Ohio, assignor to General Motors Corporation, Detroit, Mich., a corporation of Delaware Application March 25, 1939, Serial No. 264,069

3 Claims. (Cl. 192—107)

This invention relates to friction clutches of the kind used to releasably couple the shaft of the engine of a motor vehicle to the input shaft of the transmission.

An object of the invention is to improve the driven member of such a clutch.

A more specific object is to improve the means whereby axially resilient expedients are used to insure smooth clutch engagement.

Other objects will be understood from the following description.

The drawing accompanying the description shows in

Figure 1 a transverse section.

Figure 2 is a view in elevation, partly broken away.

Figure 3 is a section on line 3—3 of Figure 2.

Figures 4 and 5 are sections on line 4—4 of Figure 2, showing the parts in two different relative positions.

Figures 6 and 7 are sections on line 6—6 of Figure 2 showing the parts in two different relative positions.

Figure 8 is a detail in perspective.

Numeral 11 represents the engine shaft to which is secured a flywheel 13 by fastening means 15. To the flywheel is secured a cover 17 to serve as an abutment for suitable spring means 19 by which a pressure plate 21 is pressed toward the flywheel. The clutch driven shaft 23 carries for rotation therewith a hub 25. A series of torque transmitting springs 27 transmit the drive between the driven plate, designated as a whole by numeral 29 and the hub 25.

The driven plate comprises a disc 31. To its marginal edge are secured spring plates 33 and 35, these plates arranged alternately. Plate 33 as shown in Figure 8 has an attaching part 37 secured at its ends 39 to the disc 31 by rivets 41. The spring plate 33 has a narrow neck 43 which connects its attaching part 37 with a coplanar region 45. Region 45 is connected by an angularly extending region 47 with a region 49 which is parallel with region 45 but displaced axially therefrom.

A slot 51 extends transversely across region 49. Two parallel slots 53 extend through region 47. At the junction of portions 47 and 49 a slot 55 joins slots 51 and 53. As shown in Figure 3 the angular region 47 displaces region 49 toward the pressure plate. A friction facing 57 is riveted to portion 49 by means of a rivet 59 extending through an enlarged region 61 of slot 51. On the opposite side of spring plate 33 a friction facing 57' is secured to portion 45 by a rivet 62.

As stated above, the plates 33 are arranged alternately with plates 35. Each plate 35 has an attaching region 63 also secured by rivets 41 to disc 31. At one end of region 63 there is a radial extension 65. This extension lies in the plane of region 63 which is also the plane of regions 37 and 45 of plate 33. Facing 57' is secured to portion 65 at 67 so that the facing lies flat against coplanar surfaces of both plates. Plate 35 has an intermediate angular portion 69 and a flat portion 71 parallel with portion 65. It also has slots corresponding to the construction described in connection with plate 33. Since portion 71 is coplanar with portion 49 of plate 33 this portion provides a flat surface for facing 57, which is riveted thereto at 73. It will therefore be understood that each of the plates 33 and 35 has parallel portions displaced the one from the other so that both facings may be attached to each plate, there being angular regions 47 and 59, each extending from one friction facing to the other, the angular regions extending alternately, radially and tangentially.

When the clutch is engaged, the angular regions are flattened as may be seen by comparing Figure 5 with Figure 4 and Figure 7 with Figure 6. In this way resilient resistance is afforded to the clutch engaging action of the spring means 19. The separable connection of the spring plates economizes production costs and the facings are carried wholly by these spring plates.

I claim:

1. In a clutch, a driven plate comprising a circular disc, and a plurality of spring segments distributed about the margin of said disc, each segment having axially disposed parallel portions with angular connecting regions, the angular regions of adjacent segments extending in planes angularly related to each other, one sloping radially, the other circumferentially and facings secured to opposite sides of each plate, both facings being attached to each plate.

2. In a clutch, a driven plate comprising a circular disc, a plurality of spring plates distributed about the margin of said disc and secured thereto, each plate having axially disposed parallel portions with angular connecting regions, the angular regions of adjacent plates extending in planes angularly related to each other, one sloping radially, the other circumferentially and facings secured to opposite sides of each plate, both facings being attached to each plate, one to each of the parallel portions thereof.

3. In a clutch, a driven plate comprising a circular disc, a plurality of spring plates distributed about the margin of said disc and secured thereto, each plate having axially disposed parallel portions with angular connecting regions, the angular regions of adjacent plates extending in planes angularly related to each other and facings secured to opposite sides of each plate, both facings being attached to each plate, one of said parallel portions having a transverse slot, said angular portions having a plurality of slots parallel with but displaced from said first mentioned slot, and a slot connecting the adjacent ends of said previously mentioned slots.

WILLIAM S. WOLFRAM.